Jan. 3, 1967     G. L. LOCHER     3,296,467

MICROMETRIC LINEAR ACTUATOR

Filed April 20, 1964     2 Sheets-Sheet 1

INVENTOR.
GORDON LEE LOCHER
BY

ATTORNEY.

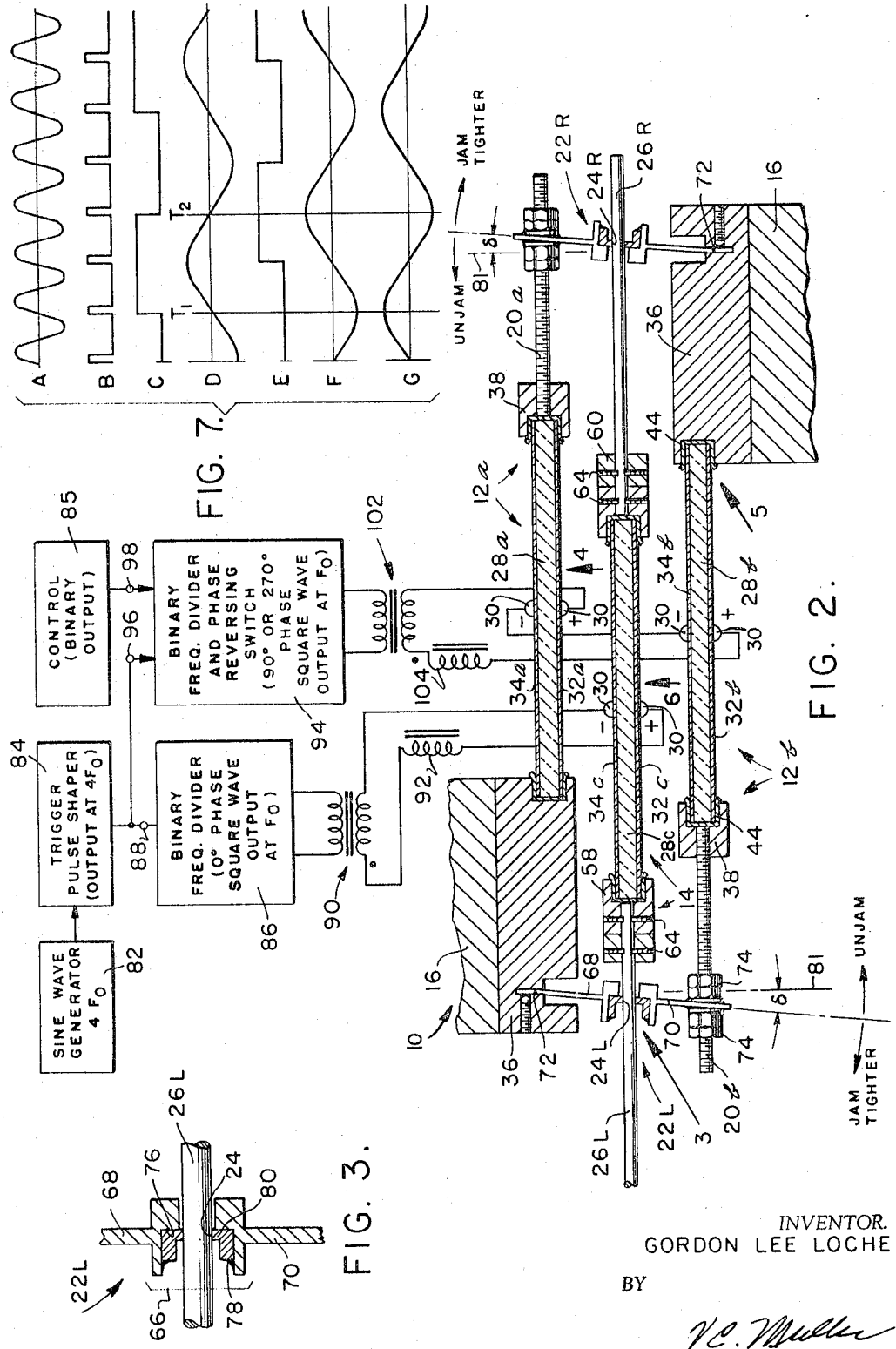

United States Patent Office 3,296,467
Patented Jan. 3, 1967

3,296,467
MICROMETRIC LINEAR ACTUATOR
Gordon L. Locher, Los Angeles, Calif., assignor, by mesne assignments, to the United States of America as represented by the Secretary of the Navy
Filed Apr. 20, 1964, Ser. No. 361,634
7 Claims. (Cl. 310—8.1)

This invention relates to a mechanism, sometimes referred to as a "linear actuator," which provides controlled rectilinear motion, and more particularly to such an actuator for controlling increments of displacement with an accuracy in the order of 0.0005 of an inch. Displacements in this order of magnitude are commonly called "micrometric" displacements.

Linear actuators for controlling micrometric displacements are employed in a variety of applications. One example is as the actuator for a miniaturized throttle valve constructed essentially as disclosed in U.S. Patent 3,093,157 to Adrian J. Aitken et al., for a "Variable Area Injector." The valve and actuator are, in turn, used as a servo valve for vernier control rocket motors in adjusting the course and attitude of space vehicles. Other uses include the control of movable parts of precision instruments such as interferometers and diffraction grating devices.

The prior art approach in controlling micrometric displacements has been chiefly to employ some form of lead screw arrangement, in much the same manner as in the common micrometer. A severe limitation of the lead screw arrangement is the tendency for lost motion to occur when a lead screw reverses direction due to the inherent imperfection of the threaded contacts. The problem is further aggravated when an actuator is to be employed to perform the conversions of an electrical signal to mechanical motion at the output of the servo system within a servo system, since a servo system having moderate dynamic response characteristics may require 20 reversals of direction of the servo actuator within a single second.

Along with the above-mentioned problem, it is of course generally desirable that a linear actuator provide a holding force in the "off" power condition, and have stable operation over a wide range of temperature conditions.

Accordingly, the objectives of the present invention include provision of:

(1) An improved linear actuator which provides positive control of extremely small displacements under reversal of directions, (2) An improved linear actuator in accordance with the previous objective which further provides a holding force in the "off" power condition, (3) An improved linear actuator in accordance with the first mentioned objective which further provides stable operation over a wide range of operating temperatures, and (4) An improved linear actuator in which the response time of its output to an electrical input is sufficiently fast for use as a component in a servo system.

Other objects and many of the attendant advantages of this invention will be readily appreciated as the same becomes better understood by reference to the following detailed description when considered in connection with the accompanying drawings wherein:

FIG. 1 is a perspective view of apparatus forming the subject of the invention,

FIG. 2 is a horizontal section taken through the apparatus of FIG. 1 along lines 2—2, FIGS. 4 and 6 (i.e. along the axes of the principal moving parts of the apparatus), and a schematic of the electrical components of the apparatus, certain dimensions in the horizontal section being exaggerated for purposes of clarity, FIG. 3 is an enlarged view of a detail indicated by arrow 3, FIG. 2;

FIG. 7 is a family of waveforms associated with the operation of the apparatus, the timing relationshtip between certain of the waveforms being diagrammatic rather than in the actual relative phase relationships in which they actually occur.

Figure 1:
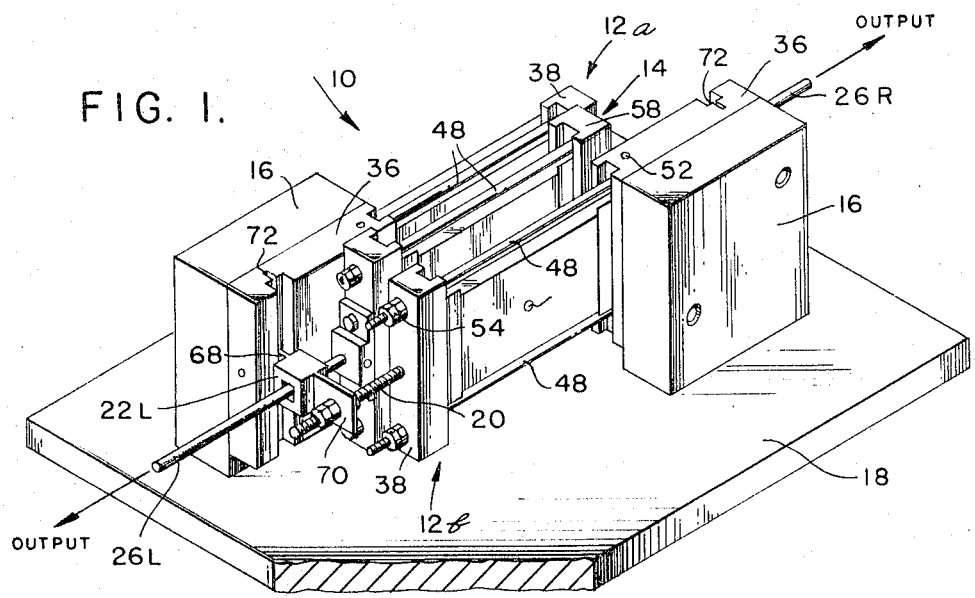

Referring now to the drawing and in particular to FIGS. 1 and 2, the subject of the invention is a linear actuator 10. Broadly, the mechanical components of actuator 10 include a set of three ultrasonic vibrators composed of a pair of fixed ended vibrators 12a, 12b, and a vibrator and slide rod unit 14. Vibrators 12a and 12b are each of a generally rectangular shape having a major axis, and are disposed with their major axes in parallel and approximately co-extensive relation. Vibrators 12a, 12b are affixed to upright supports 16 at mutual opposed ends of the respective vibrators. The uprights 16, in turn, are rigidly affixed to a base plate 18 (FIG. 1, only). Threaded vibrator coupling rods 20a, 20b extend from the non-fixed ends of vibrators 12a and 12b, respectively. Flexible bearing support members 22L and 22R adjacent the left and right ends (as shown on the drawing) of vibrators 12a, 12b, are each connected between structure which is rigidly affixed to the upright 16 and the opposite vibration coupling rod 20. Each bearing support member 22 contains a jam and slide bearing surface 24 (FIGS. 2 and 3). Vibrator and slide rod unit 14 comprises a vibrator of rectangular shape similar to that of vibrators 12a, 12b and is provided with rigidly affixed slide rods 26L, 26R projecting from its respective ends. Unit 14 is disposed in parallel relation to and between vibrators 12a and 12b with rods 26L and 26R passing through jam and slide bearing surfaces 24L and 24R. Unit 14 is the element of actuator 10 which undergoes the rectilinear movement, and an output may be conveniently taken for the outer ends of either slide rod, as indicated by the legend in the drawing.

Figure 4:
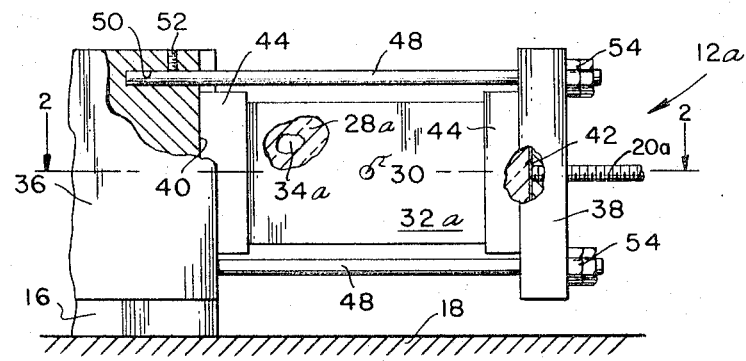
FIG. 4 is a side elevation view of a portion of the apparatus taken along arrow 4, FIG. 2.
Figure 5:
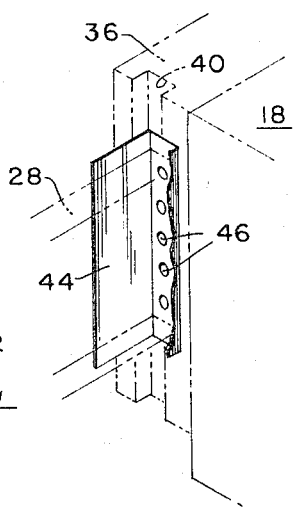
FIG. 5 is a perspective view of a detail indicated by arrow 5, FIG. 2.

Since fixed ended vibrators 12a, 12b are essentially identical it is only necessary to describe vibrator 12a. Vibrator 12a, which may be best understood from the view of FIG. 4 taken in conjunction with that of FIG. 2, comprises a rectangular slab 28a of electrostrictive material which is excited through suitable electric leads 30 connected to electrodes 32a, 34a formed as layers of metal coated on opposite faces of the slab. The length of the slab along its major dimension is chosen to equal one-half of the length of the wavelength of acoustic energy at a predetermined ultra-sonic frequency $F_0$ at which the vibrator will resonantly oscillate. The correspondence between the length of slab and the predetermined frequency $F_0$ is not a precise relationship, since the frequency of resonant oscillation of the vibrator is affected by the associated metal parts. Exact correspondence between the frequency of an exciting signal and resonant oscillation of the vibrator is obtained by providing a margin of tuning adjustability in the excitation circuitry, and tuning same to cause resonant oscillation of the vibrator. Slab 28a is made of a material chosen to have a high cross coupling co-efficient between the electrostrictive dimensional changes across its thickness dimension and dimensional changes along its major axis. One example of such material is PZT-4 type lead-zirconium-titanate ceramic material manufactured by Clevite Corporation of Bedford, Ohio. Slab 28a of electrostrictive material is adapted to exhibit permanent electrostrictive polarization characteristics across its thickness dimension and the plates 32a and 34a are the positive (+) and negative (−) electrodes, respectively, as has been indicated on the drawing. The electrostrictive transfer characteristics of slab 28 are such that a positive voltage applied to positive electrode 32a relative to negative electrode 34a results in expansion of the slab, and a negative voltage results in contraction of the slab. A brass block 36 is affixed to upright 16 by means of assembly bolts, not shown. Slab 28a is mounted between block 36, and another brass member 38 with the minor edges of the slab seated in confrontingly aligned slots 40 and 42 (identified by reference numerals in FIG. 4, only) formed in members 36 and 38, respectively. An insulation sheet 44, of Teflon, FIG. 5, is interposed between each minor edge of the oscillator element and the surfaces of the slot. As best shown in FIG. 5, the portion of insulation sheet 44 which is seated at the bottom of the slot is provided with a series of perforations 46, and epoxy resin (not shown) is flowed into the holes and allowed to set during assembly. Epoxy resin has characteristics which are optimally suited as an agent to provide rigid bonding between the edge of the slab and the bottom of the slot because it has good dielectric and mechanical strength, and also is a moderately good transmitter of sonic energy. The Teflon sheeting alone, on the other hand, would be a poor transmitter of sonic energy. Member 38 and member 36 are connected together by a pair of stainless steel tie bolts 48, FIGS. 1 and 4. One end of each tie bolt is disposed in a blind hole 50 formed in member 36 in the bottom of slot 40 and locked in place by a set screw 52. The other end of the tie bolt passes through aligned apertures in member 38 and projects from its outer side. This projecting portion of the tie bolt is threaded and provided with clamp nuts 54 which are suitably tightened to place slab 28a under a compression of approximately forty pounds per square inch (40 p.s.i.) in its lengthwise direction. This minimizes energy loss through ultra-sonic "rattles," which in turn increases the "mechanical Q" or storage factor of the vibrator. The connecting rod 20a is provided with fine pitch threads and is rigidly attached to member 38 by an end portion which threadedly engages a tapped aperture formed in the member and which is fixed in place by silver brazing. Brass block 36, slab 28a, tie bolts 48 and brass member 38 provide an integral vibrating structure which resonantly oscillates under application of a suitable excitation voltage at frequency $F_0$ across the electrodes. However, since block 36 forms a massive structure in rigid relationship with base 18, the end of slab 28a in slot 40 remains stationary in rigid abutment against the bottom of the slot, and therefore only the remaining expanse of the vibrating structure is displaced in vibration under the force of the expansion and contraction of the slab. As a result, the end of the vibrator which carries the coupling rod experiences a cycle of displacements corresponding to the peak-to-peak amplitude of the expansion-contraction cycle of the slab. It has been found that with the described structure there is no standing wave behavior along coupling rod 20a, and that instead the coupling rod directly couples vibrating displacements experienced at the adjacent end of the vibrating structure. The structure of vibrator 12b, FIGS. 1 and 2, is essentially the same as that of vibrator 12a, except that slab 28b is mounted with its positive and negative electrode 32b and 34b disposed in an orientation relative to the other parts of the vibrator which is opposite that of vibrator 12a. However, since vibrators 12a and 12b are disposed in parallel relation with their free ends extending in opposite directions, the positive and negative electrodes of both vibrators end up in the same orientation relative to the overall structure of device 10.

Figure 6:
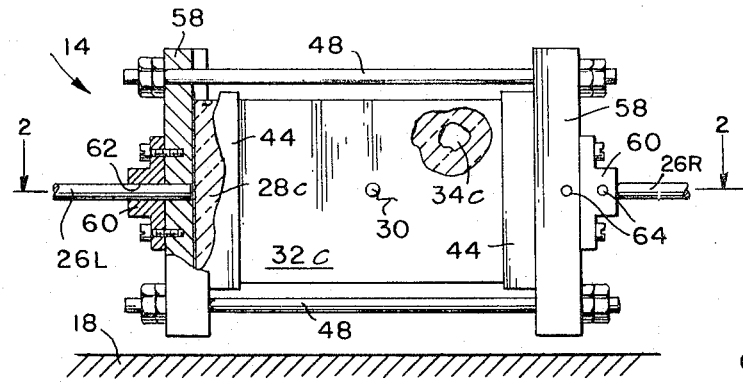
FIG. 6 is a side elevation of a portion of the apparatus taken along line 6, FIG. 2.

Vibrator and slide rod unit 14, which may be best understood from the view of FIG. 6 taken in conjunction with FIG. 2, comprises a slab 28c and positive and negative electrodes 32c, 34c, essentially identical to those in vibrators 12a and 12b. Slab 28c is mounted between a pair of brass frame members 58 with essentially the same arrangement of confronting slots, insulating sheets, epoxy resin filling, and tensioned tie bolts, as described in connection with stationary vibrator 12a. Slab 28c is mounted with its positive and negative electrodes 32c and 34c in the same orientation relative to the overall structure of device 10 as those of vibrators 12a and 12b. Extension blocks 60, of hardened steel, are attached to the outside edge of each frame element 58 and the bores 62 for receiving the slide rods 26L and 26R are extended through both the extension block and the yoke. The steel extension blocks increase the bearing length and improve sonic coupling. Each slide rod is locked in place by four set screws 64 (FIG. 2, only). The slide rods 26L and 26R are assembled to the respective ends of vibrator 14 with a very high degree of precision of colinear alignment with respect to one another, and are made of tungsten carbide, this metal being ideally suited because of its wear resistance and its high velocity of propagation of sonic energy. In similar manner to vibrators 12a and 12b, the slab, frame members, tie bolts, extension blocks, and slide rods provide an integral vibrating structure which resonantly oscillates under application of an excitation signal at frequency $F_0$, and the length of slab 28c corresponds to one-half the wavelength at frequency $F_0$. It has been found that at this frequency unit 14 forms a resonant oscillating vibrating system, having a standing wave node, at which minimum amplitude of the longitudinal waves occur, disposed midway between the ends of the slab. The vibrating system also has regions along each slide rod, extending outwardly from the point at which the slide rods emerge from the respective extension blocks for an appreciable distance along the slide rod, in which the vibrating system behaves substantially as a standing wave loop or anti-node, at which maximum standing wave amplitude occurs. For example, in one form of construction of unit 14 employed in a highly successful operation embodiment of device 10, it was found that substantially uniform standing wave loop behavior was exhibited along rods 26L and 26R for a distance extending 0.500 inch along the rods from the point at which they emerge from the extension block.

The structure associated with flexible bearing support members 22L, 22R, may be best understood from the view of FIG. 3 taken in conjunction with FIG. 2. Members 22L, 22R are made of spring steel and has a thickened midportion 66 and oppositely extending thin strip-like portions 68 and 70. Section 68 extends into a slot 72 formed in the face of member 38 and is locked in place by a set screw. Portion 70 contains an aperture through which the adjacent connecting rod 20 passes, and is tightly fastened to rod 20 between a pair of set nuts 74, FIG. 2. The thickened mid-portion 66 of each bearing support member has a cavity 76 formed in its outer face, and a perforation extends from the bottom of the cavity to the other face. A collet 78, made of tungsten carbide, is seated and fixed in place by silver brazing. Collet 78 includes a thin rim portion 80, which forms the slide bearing and jam surface 24 for engagement with the slide rods 26L, 26R. Surface 24 is a precision cylindrical surface in precise transverse alignment with the support member. Surface 24 and slide rod 26 are so constructed to provide only a very small finite clearance therebetween when their respective axes are in alignment. For example, in one operational embodiment employing ⅛ inch diameter slide rods, the nominal clearance between surface 24 and the rod is 170 micro-inches. As the result of the small clearance even a slight misalignment of bearing surface relative to slide rod causes the bearing surface to jam and grip the slide rod at the point of contact. Because of the thinness of mid-portion 80, and because surface 24 is formed with sharp corners, a high loading stress is developed at times when the bearing surface 24 jams the slide rod, resulting in a high jamming force. The slot 72, in which portion 68 of each of flexible support member 22L, 22R is disposed, is aligned along a reference line 81 of precise transverse alignment relative to the axis of the adjacent slide rod 26 and to the axis of the adjacent coupling rod 20. Portion 70 of each flexible bearing support member 22 is displaced from this reference line 81 by a small finite distance delta ($\delta$) in the outward direction along rod 20. This position is determined by adjustment of set nuts 74 while the vibrators are at rest. Displacement of portion 70 away from position 81 results in a small finite deflection of the bearing support member about the point at which the portion 68 emerges from slot 72, which in turn misaligns the axis of surface 24 relative to the axis of the slide rod. Distance delta ($\delta$) is determined by adjustment of the positions of set nuts 74 during a final adjustment stage of assembly. The adjustment of the set nuts 74 is so made that surface 24 jams the slide rod with a desired holding force when the vibrators are at rest, and that under expansion of the vibrator to which the bearing support is connected, surface 24 jams the slide rod more tightly, and that under contraction of the vibrator slide rod 26 becomes unjammed. This has been indicated in FIG. 2 of the drawing by arrowheads representing the opposite directions of deflection of the support members and the corresponding legends "Jam Tighter" and "Unjam." It has been found that the adjustment of distance delta ($\delta$) is not critical or difficult to make. In fact a range of acceptable adjustment exists which permit a choice of various combinations of output thrusts and rate of movement.

Various construction details are provided throughout the mechanical structure to insure against rattles and loosening of the structure under ultrasonic vibration. All members which are locked by set screws are provided with "flats" or other seating surfaces at points at which the set screws will engage the member. All set nuts are rigidly locked by means of an associated jam nut. During assembly of set screws a mixture of bonding agent and grit is flowed into the set screw holes, and during final tightening of jam nuts such mixture is coated on abutting faces of the jam nuts. A mixture of epoxy resin and 150 mesh boron carbide powder has been found to have excellent characteristic for these purposes. In the case of vibrator unit and slide rod 14, the entire unit is preferably oven baked in order to cause the epoxy resin to set "hard." Melted solder is flowed in and around all exposed portions of fasteners and allowed to set.

As shown in FIG. 2, the electrical components of device 10 comprise a master oscillator 82 which produces a sine wave output at a frequency 4 $F_0$, or four times the frequency of resonant oscillation at which the electrostrictive slabs are half-wave oscillators. The oscillator circuitry is provided with a margin of adjustability in order that the systems may be tuned into resonant behavior. From oscillator 82, wave A is fed to a conventional trigger pulse shaper 84 which produces a trigger wave B, providing one pulse in synchronous relation to each cycle of output from oscillator 82.

A direction of motion control 85, provides a binary output signal (not shown). One of the binary conditions of the output signal from control 85 constitutes an electrical order signal for vibrator and slide rod unit 14 to move toward the left (as this direction appears in the drawing), and the other condition constitutes an electrical order signal to move toward the right. Control 85 is, in turn, actuated by some control stimuli, not forming part of the present invention. For example, where actuator 10 is employed as part of a position control servo, control 85 may be actuated by some displacement difference sensing device, which compares the actual position of the part moved by actuator 10 with its desired position and which then actuates control 85 to cause unit 14 to move in a direction to reduce the difference between the actual and desired displacements. In other instances, actuation of control 85 could come from a simple manually operated control, or an automatic programmer.

A frequency divider stage 86 has an input 88 to receive the signal whose frequency is to be divided. Wave B, from pulse shaper 84 is applied to this input 88. Stage 86, which is of conventional multivibrator type scaling circuit construction, is operative to produce an output consisting of a regularly shaped square wave signal, waveform C, having a period corresponding to the periods of four trigger pulse of wave B. Accordingly, the output of stage 86 is a square wave having a frequency, or repetition rate, equal to $F_0$.

From the output of divider circuit 88, wave C is applied through a driver amplifier (not shown) to the primary winding of a voltage step-up transformer 90. The secondary winding of the transformer is bifilar wound and provides a predetermined phase relationship of signal at its terminals, as indicated by the conventional dot symbol. The dotted end of the secondary winding is connected to one end of an inductor 92; the other end of the inductor is connected to positive polarity electrode plate 32c of vibrator and slide rod unit 14; and negative polarity electrode plate 34c is connected to the other end of the secondary winding. Electrode plates 32c, 34c act as a capacitor in this circuit, the distributed area of the plates and thinness of dielectric therebetween providing a configuration which inherently exhibits appreciable capacitance. The magnitude of inductive impedance of inductor 92 is so chosen relative to the magnitude of capacitance provided by the electrode plates, to form a series resonant circuit at frequency $F_0$ in cooperation with the capacitance. In accordance with well known principles of series resonant operation, square wave C is smoothed by the resonant circuit action causing an approximate sine wave signal, waveform D, to appear at plate 32c relative to plate 34c. The positive and negative half cycles of wave D occur in a predetermined synchronous relationship to the high and low states of the square waves, as diagrammatically shown in the waveforms by time correspondence between positive and negative half cycles of the sine wave and the high and low states of square wave from which they are derived (with more rigorous treatment a phase shift would be shown). The driver amplifier (not shown) and other circuit components are so chosen that the magnitude of resonant voltage appearing across the plates is suitable to drive the amplifier. In one highly successful operational embodiment the peak-to-peak voltage across the electrodes was in the order of two kilovolts (2 kv.).

A frequency divider and phase reversing switching stage 94 has an input 96 to receive the electrical signal whose frequency is to be divided. Wave B is applied to input 96. Stage 94 contains frequency dividing circuitry for providing a square wave output at frequency $F_0$ which like stage 86 is of conventional multivibrator type scaling circuit construction, except that it is further modified to provide output points in the scaling circuit at which the output square wave appears in a form that synchronously lags wave C by one-quarter of the square wave period, wave E, and another circuit point at which the output square wave appears in a form that lags wave C by three-quarters of the square wave period (not shown). Thus in addition to the function of dividing the frequency of signal applied to its input 96, stage 94 also serves a function analogous to phase splitting, by which outputs that lag wave C by one-quarter, and three-quarters of a period, respectively, are available. The scaling circuitry may be modified to perform this phase splitting by conventional circuit construction such as through combinations of logic gates connected to the scaling multivibrator units, constructed in accordance with conventional techniques of logical design of timing systems. An alternative technique for modifying the scaling circuit to perform the phase splitting is through the interconnection of the multivibrator units in the scaling circuit through differentiator and polarity selective circuits. Stage 94 also has a switch control input 98. The binary signal from direction of motion control 85 is applied to input 98. Stage 94 includes switching circuitry which alternately applies the one-quarter period lagging square wave, or the three-quarter period lagging square wave to the output of the stage. The switching circuitry, which is of conventional logic gate type of construction applies the one-quarter period lagging square to the output of the stage in response to the binary signal control 85 which corresponds to an order for unit 14 to move toward the left, and applies the three-quarater period lagging to the output in response to the signal to move toward the right. The phase splitting circuitry is provided with a margin of adjustability, by conventional techniques of introducing adjustable delays, in order to allow for final tuning of actuator 10.

The output of stage 94 is applied to a voltage step-up transformer 102 through a driver amplifier (not shown). The dotted end of a bifilar wound secondary winding of transformer 102 is connected to one end of an inductor 104, the other end of inductor 104 is connected to positive polarity electrode 32b of vibrator 12b, negative polarity electrode 34b is connected to negative polarity electrode 34a of vibrator 12a, and positive polarity electrode 32a is returned to the other end of the secondary winding of transformer 102. Electrode plates 32b, 34b, and electrode plates 32a, 34a each act as individual capacitors and provide a combined capacitance in the circuit in accordance with the well known formula for calculating combined capacitance of series connected capacitors. Inductance 104 is chosen to form a series resonant circuit with this combined capacitance at frequency $F_0$. Assuming that stage 94 is applying the one-quarter period lagging square wave signal, wave E, across the series resonant circuit, the voltage appearing at plate 32b relative to plate 34b, wave F, has its positive and negative half cycle in synchronous correspondence with the positive and negative halfs of square wave E, and therefore lags wave D by ninety electrical degrees in phase relationship. Since plates 32a and 34a of vibrator 12a are connected in the series resonant circuit with their positive and negative terminal oriented in an opposite circuit direction the wave of voltage appearing at electrode 32a relative to electrode 32b, wave G, appearing across these electrodes is inverted in polarity relative to wave F. This polarity inversion corresponds to a 180° phase shift, so that wave G lags wave D by 270°.

The operation of linear actuator device 10 will be described by reference to waves D, F and G, FIG. 7, taken in conjunction with FIG. 2. For purposes of illustration it is assumed that sine wave D, F and G across unit 14, vibrator 12b, and vibrator 12d are in their 0°, 90° and 270° phase relationships, respectively. As previously noted these phase conditions exist when the electrical order from control 85 commands unit 14 to move toward the left. Unit 14 oscillates under excitation of wave D, with its peaks of expansion and peaks of contraction occurring in synchronous relation to the positive and negative peak of the wave. The interval in the oscillatory cycle of unit 14 extending from a contraction peak to its expansion peak constitutes the expansion half of the cycle, and the interval extending from the expansion peak to the contraction peak constitutes the contraction half of the cycle. Accordingly, in the cycle of wave D the moment, time $T_1$, at which the wave passes through the zero axis in a positive going direction corresponds to the middle of an expansion half cycle of the synchronous oscillating cycle of unit 14, and this moment also coincides with the moment at which the rate of expansion is the largest. Waves F and G cause similar synchronous oscillation of vibrators 12b and 12a, which in turn are coupled to flexible supports 22L and 22R, respectively. Wave F is at its negative peak at time $T_1$, and this point in the wave cycle corresponds to the maximum displacement of support 22L in the direction of unjamming rod 26L. Wave G is at its positive peak at time $T_1$, and this corresponds to maximum displacement of flexible support 22R in the direction causing rod 26R to be more tightly jammed. Thus, slide rod 26L becomes more tightly jammed in synchronously timed relation to the middle of the expansion half of the cycle of vibration of unit 14. Jamming slide rod 26R by surface 24R holds unit 14 stationary at this point and therefore the expansion half of the cycle of vibration of unit 14 results in the movement of slide rod 26L through surface 24L toward the left. It can be similarly shown that at time $T_2$, one-half of a wave period later, corresponds to a synchronous condition in which unit 14 is in the middle of the contraction half of its cycle and that flexible support 22L is at the peak of the jamming portion of its cycle of deflection, and flexible support 22R at the peak of the unjamming portion of its cycle. As a result slide rod 26L becomes more tightly jammed and slide rod 26R becomes unjammed in synchronously timed relation to the middle of the contraction half of cycle of vibration of unit 14. Accordingly, before the contraction half of the cycle of unit 14 results in the return movement of slide rod 26L through surface 24L, slide rod 26L becomes tightly jammed by surface 24L, holding unit 14 stationary at the point of jamming. The contraction half of the cycle of unit 14 therefore results in the movement of slide rod 26R to the left through surface 24R. Thus unit 14 is stepped toward the left after completion of a full cycle, and unit 14 will continue such stepwise movement to the left as long as electrical excitation is applied to the vibrators in the specified phase relationship.

It can be similarly shown that application of sine wave signals to unit 14, vibrator 12a and vibrator 12b in 0°, 270° and 90° phase relationship, which results from the presence of the three-quarter period lagging square wave at the output of stage 94, causes unit 14 to move to the right. When electrical excitation is removed from the vibrators, unit 14 is held stationary by the jamming forces exerted by surfaces 24 when flexible supports 26L and 26R are in their rest positions.

It is to be noted that amplitude of rectilinear movement of unit 14 during each cycle of vibration depends on the relative movement between the slide rods and its associated jam and slide rod surfaces 24, when the latter act as slide bearings. It is therefore necessary that the slide rods provide the appreciable and uniform amplitude of wave motion at the point at which they pass through surfaces 24, regardless of the position of unit 14 along its full range of movement, or stroke. Accordingly, it is an important feature of construction of the invention that unit 14 is so constructed that the slide rods exhibit uniform standing wave loop behavior for an appreciable distance along their length from the point at which they emerge from the extension blocks. It will be apparent that the maximum stroke of actuator 10 is limited by the distance along the slide rods at which uniform standing wave motion of an acceptable amplitude is provided, and it can be shown that the maximum stroke is one-half this distance. For example, in the case of the previously described operational embodiment in which standing wave loop behavior was exhibited for a distance extending 0.500 inch along the rods from the point at the slide rods emerge from the extension block, a stroke of 0.250 inch is possible. It will be appreciated that the distance 0.250 inch is very large when considered in light of the device being used for micrometric displacements.

Obviously many modifications and variations of the present invention are possible in the light of the above teachings. It is therefore to be understood that within the scope of the appended claims the invention may be practiced otherwise than as specifically described.

What is claimed is:
1. A linear actuator, comprising;
    (a) a set of three elongated electrically excitable vibrator elements disposed in laterally spaced, parallel and generally coextensive relation, said set composed of a first and second stationarily mounted vibrator elements in one and the other of the outer lateral positions and a third output movement vibrator between them, the ends of the individual vibrator elements of the set being disposed at first and second opposite reference ends of the set,
    (b) rigid frame means adapted to support said first vibrator element with the end thereof at the first reference end of the set in rigid abutting contact with a first abutment portion of the frame means and with the remaining expanse of the vibrator element free to vibrate, and adapted to support said second vibrator element with the end thereof at the second reference end of the set in rigid abutting contact with a second abutment portion of the frame means, and with the remaining expanse of the vibrator element free to vibrate,
    (c) said third vibrator having a standing wave nodal zone disposed midway between its ends at which minimum amplitude of vibration waves occur, said third vibrator element carrying a longitudinally extending slide surface means in rigid relationship therewith, said slide member having first and second standing wave loop zones at which appreciable amplitude of vibration wave occurs in longitudinally spaced relation about the nodal zone and disposed in directions toward the first and second reference ends of the set, respectively,
    (d) a first jam and slide bearing means disposed at a slide member jamming station adjacent said first standing wave loop zone of the slide surface means and operatively connected to the vibrating end of the second vibrator element, and a second jam and slide bearing means disposed at a slide member jamming station adjacent said second standing wave loop zone of the slide surface means and operatively connected to the vibrating end of the first vibrator element, said jam and slide bearing means each having a cycle of operation in synchronous relation to the cycle of vibration of the end of the vibrator element to which it is connected, said cycle of operation including a cycle portion for jamming the slide surface means, and a cycle portion permitting the sliding of the slide surface means in its longitudinal direction,
    (e) means for individually exciting the vibrator elements of the set with alternating signals at a common predetermined frequency chosen to cause vibration of the vibrator elements in predetermined synchronized phase relationships to cause the first and second jam and slide bearing means to jam the slide surface means in predetermined relation to the expansion and contraction of the second bar such that the second bar is stepped in rectilinear motion.

2. A linear actuator in accordance with claim 1 wherein,
    (f) said vibrator elements of the set each comprising a rectilinear slab of electrostrictive material having first and second electrode plates adjacent to and essentially co-extensive with its sides.

3. A linear actuator in accordance with claim 1 wherein,
    (g) said means for individually exciting the vibrator elements comprising the first and second plates of the individual vibrator elements forming a capacitor and being series connected with an inductance means, said capacitor and said inductance means being adapted to form a series resonant circuit at said predetermined frequency.

4. A linear actuator in accordance with claim 1, wherein;
    (h) said first and second jam and slide bearing means each comprises a flexible supported bearing surface through which said slide surface means passes, said bearing surface each adapted to be moved through said cycle of operation by the end of a vibrator element to which it is operatively connected, said cycle portion for jamming the slide surface means including a position in which the bearing surface is in misaligned relationship with the slide surface means, and said cycle portion permitting sliding including a position in which the bearing surface is in aligned relationship with the slide surface means.

5. A linear actuator in accordance with claim 4,
    (i) said bearing surfaces each being disposed in a rest position in which it is in misaligned relationship to the slide surface means when the vibrator element to which it is operatively connected is in an un-excited condition to thereby provide an off power holding force, the construction and arrangement being such that the bearing surface is moved away from the rest position in one of opposite directions of motion during the cycle portion for jamming the slide surface means, and in the other direction of motion during the cycle portion permitting sliding.

6. A linear actuator in accordance with claim 4, wherein,
    (j) said slide surface means comprises a rod projecting from each end of the output movement vibrator passing through the adjacent bearing surface, said bearing surface being carried by a strip of resilient metal disposed in spaced relationship away from the end of the vibrating element to which it is operatively connected and disposed transversely across the rod axis and coupled at one of its ends to the vibrating end of the vibrator element to which it is operatively connected and affixed at its other end to structure in rigid relation to the frame means.

7. A linear actuator in accordance with claim 1,
    (k) said first and second stationarily mounted vibrator element being excited by signals of essentially opposed phase relations, and said output movement vibrator element being excited in quadrature phased relation to one of the signals of opposed phase relation.

References Cited by the Examiner

UNITED STATES PATENTS 3,162,368   12/1964   Choate _____ 310—8.3
3,167,667   1/1965    Lukso _____ 310—9.8

MILTON O. HIRSHFIELD, *Primary Examiner.*

J. D. MILLER, *Assistant Examiner.*